Sept. 19, 1967   R. H. RHEAUME   3,343,096
SYSTEM FOR PRODUCING HIGH ENERGY, HIGH
INTENSITY CHARGED PARTICLE BEAMS
Filed March 19, 1965  4 Sheets-Sheet 1

INVENTOR.
RAYMOND H. RHEAUME
BY

Sept. 19, 1967  R. H. RHEAUME  3,343,096
SYSTEM FOR PRODUCING HIGH ENERGY, HIGH
INTENSITY CHARGED PARTICLE BEAMS
Filed March 19, 1965  4 Sheets-Sheet 3

INVENTOR.
RAYMOND H. RHEAUME
BY

INVENTOR.
RAYMOND H. RHEAUME

United States Patent Office 3,343,096
Patented Sept. 19, 1967

3,343,096
SYSTEM FOR PRODUCING HIGH ENERGY, HIGH
INTENSITY CHARGED PARTICLE BEAMS
Raymond H. Rheaume, Stony Brook, N.Y., assignor to
the United States of America as represented by the
United States Atomic Energy Commission
Filed Mar. 19, 1965, Ser. No. 441,394
10 Claims. (Cl. 328—235)

ABSTRACT OF THE DISCLOSURE

Linear and cyclic accelerator system for producing high energy high intensity charged particle beams having a drive saturated high frequency power amplifier, a hard tube modulator, and means deriving command signals from the cyclic and linear accelerators and utilizing the signals therefrom to produce a modulator input signal that causes the modulator to control the amplifier for producing a signal corresponding in envelope contour, voltage gradient and repetition rate with the modulator input signal for controlling the high frequency power amplifier to energize the linear accelerator with an input of the desired envelope contour, voltage gradient and repetition rate for producing high energy, high intensity beams of charged particles in said accelerators.

---

This invention relates to high energy physics and more particularly to linear accelerator injectors for alternating gradient proton synchrotrons.

The invention described herein was made in the course of, or under, a contract with the U.S. Atomic Energy Commission.

In high energy physics a need exists for a linear accelerator capable of providing a high intensity proton beam for injection into multiple bev. alternating gradient synchrotrons such as described in U.S. Patent 2,882,396, hereinafter referred to as cyclic accelerators, to provide sufficient particles for acceleration up to the space charge repulsion limit of the cyclic accelerators. This theoretical space charge repulsion limit is over $10^{12}$ protons per pulse. Moreover, the magnitude and contour of the voltage gradient in the tank of the linear accelerator, hereinafter referred to as the linac, must be precisely controlled to provide high angular and spectral purity whereby the injection and capture efficiency in the cyclic accelerators is high. The required linac beam spread is not more than ±2 milliradians at 50 mev.

Because of the forces involved, it is very difficult to impart an identical, precisely specified energy and direction to all the protons regardless of whether this happens to be a maximum possible energy, or whether only a few microamperes or as much as 100 milliamperes of linac proton beam current are flowing.

In one approach, increasing the linac RF power amplifier drive input has resulted in insufficient speed and precision of control, whereby sufficient spectral and angular beam control have been lacking.

Another approach maximizes the beam power output from the linear accelerator for a given pulse repetition rate and duty factor of the driving RF power amplifier by making vernier adjustments to the value of the output phase/frequency of the RF power amplifier in order to maximize the energy gain of the charged particles themselves. This above described system is ingenious and accurate. However, it relates to a precise control of the frequency of the RF power amplifier output and there is no provision for increased power output of the RF power amplifier. This method suffers further from the defect that it is also an inherently slower type of feed back loop than would be desirable for this application. Additionally, it has been desirable to adjust the pulse lengths and repetition rates of the linac beam so as conveniently to lengthen the injection period beyond the present one or two turns around the synchrotron's half-mile orbit.

It is an object of this invention, therefore, to provide an economical and practical apparatus and method for the acceleration of protons in a linac in a high intensity beam having acceptable angular and spectral purity by providing hard tube modulators for passing energy to the anodes of drive-saturated RF power amplifiers for energizing the linac in response to accurate, fast, closed loop signals derived from the linac particle tank;

It is a further object to provide an economical and practical linear accelerator for providing a high intensity beam of protons for injection into a cyclic accelerator up to its space charge repulsion limit;

It is a further object to provide a high frequency, high power level output in RF power amplifiers for proton linear accelerators having a beam current from a few microamperes up to as much as 100 milliamperes;

A further object is to adjust the pulse length and repetition rates of RF amplifiers for proton linear accelerators for adjusting the pulse length and repetition rates of the linac particle beam;

A still further object is to provide precision of control and contour of the linac tank RF voltage gradient in linear accelerators;

Another object is to increase the beam intensity of cyclic accelerators by increasing the output intensity of present linear accelerator injector outputs therefor.

It is another object to lengthen the injection period in cyclic proton accelerators for an unlimited number of turns injections.

By this invention there is provided method and apparatus for energizing the Brookhaven National Laboratory 50 mev. linear accelerator injector for providing a high intensity proton beam in the 33 bev. alternating gradient synchrotron at the Brookhaven National Laboratory up to its space charge repulsion limit. The method and construction involved in this invention utilize standard and well-known techniques and apparatus and are highly flexible for a wide range of applications, energies, frequencies intensities and types of accelerators. More particularly, this invention involves the use of a hard tube modulator which is used to energize drive saturated RF power amplifiers for accelerating the particles in the linac tank of the linear accelerator. These hard tube modulators are arranged, in one embodiment, with an internal feedback system to cooperate with a kilovolt amperes reactive capacitor bank, hereinafter referred to as a KVAR capacitor bank, to pass a fraction of the energy stored therein to the anodes of the drive saturated RF power amplifier upon command of a low level voltage waveform derived from the linac tank and a suitable reference waveform source. With the proper selection of components, as hereinafter to be more particularly described, it is possible to obtain the desired high intensity beams.

The above and further objects and novel features of this invention will appear more fully from the following detailed description when the same is read in connection with the accompanying drawings. It is to be expressly understood, however, that the drawings are not intended as a definition of the invention but are for the purpose of illustration only.

In the drawings where like parts are marked alike:

FIG. 2b is a graphic representation of the demodulated envelope of the trace of FIG. 2a.

Figure 1:
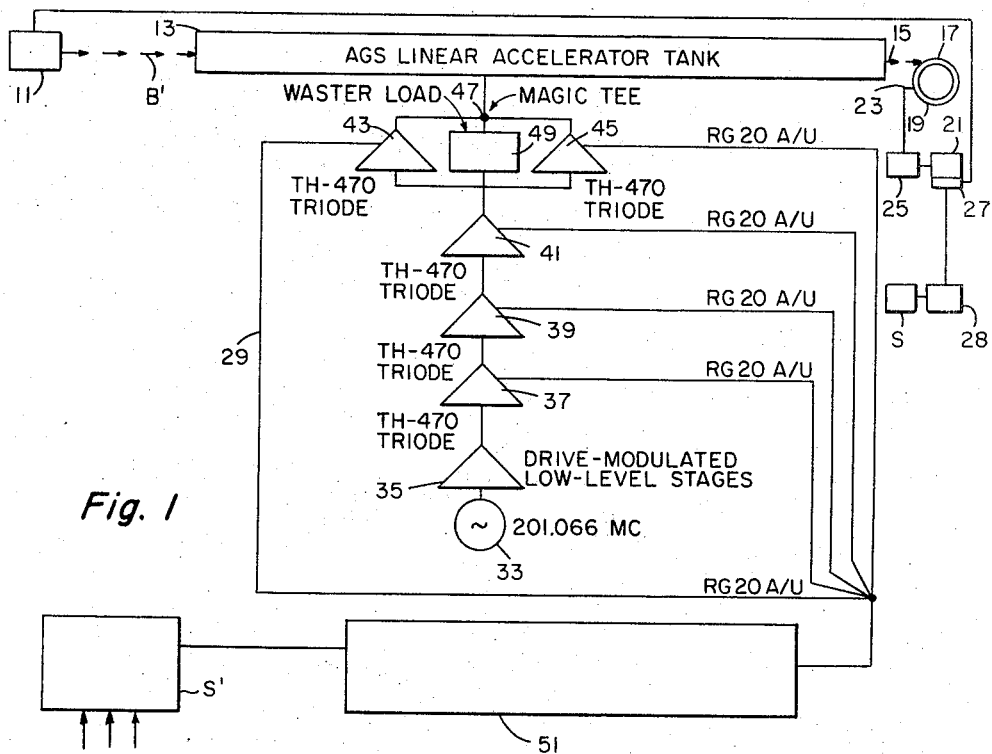
FIG. 1 is a partial schematic drawing of a linac RF power amplifier for a linac injector for an alternating gradient synchrotron, hereinafter referred to as an AGS or AGS cyclic accelerator.
Figure 4:
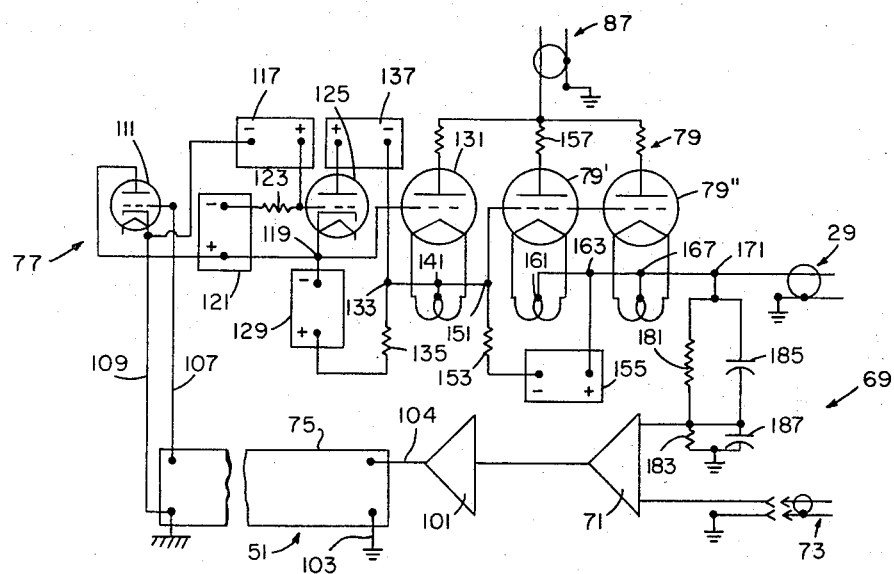
FIG. 4 is a partial wiring diagram of the hard tube modulator and inverse feedback system of FIG. 3.

Referring to FIG. 1 a conventional proton source 11 injects protons into linear accelerator (linac) tank 13 where the particles are accelerated in the form of a pulsed beam 15 for injection into cyclic accelerator 17. The linac and source are described in "The Linear Accelerator Injector for the AGS" by S. Giordano and the cyclic accelerator is described in "The Brookhaven Alternating Gradient Synchrotron" by John P. Blewett, both of which are reprinted in the 1960 International Convention Record, Part 9. FIG. 1 of the former paper shows the linac and source and FIG. 4 of the latter paper shows a typical AGS magnet. One of these magnets has a peaking strip to actuate the linac source at the proper time, as is well understood in the art.

The cyclic accelerator comprises an endless evacuated tube 19 adapted to receive protons at 50 mev. Strong focusing magnets, one of which is shown schematically for ease of explanation as magnet 21, are used in confining the protons with a small betatron frequency away from the walls of the tube while radio-frequency accelerating means (not shown for ease of explanation) accelerate the protons to 30 bev. or more as is well known in the art. The RF accelerating means is programmed to provide the required RF acceleration and a conventional probe 23 is actuated by the cyclic accelerator beam properly to control energy source 25 for the magnets. Magnet 21 has conventional peaking strips 27 which are actuated by the energization of magnet 21 to produce a control signal spike for actuating the linear accelerator source 11 at the proper time. This control magnet also actuates conventional monovibrators 28, having a conventional energy source S for the production of rectangular wave pulses having a rise time of .1 μsec., a duration of 0–300 μsec., an amplitude of 0–35 v. and a repetition rate of 1–3 sec., depending on experimental demands, all of which is well understood in the art.

The linac tank 13 is an evacuated ($10^{-6}$ torr) π-mode cylindrical standing waveguide of copperweld steel approximately 110 feet long and three feet in diameter with 124 drift tubes providing a field-free passage of protons along the central axis between successive accelerating gaps. The particles enter the tank from a Cockcroft-Walton generator source 11 at 750 kev. and leave from the opposite end at 50 mev. energy.

Figure 2A:
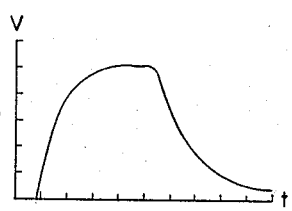
FIG. 2a is a graphic representation of a typical scope trace with 10 ma. beam loading for 8 μsec./cm. sweep speed, with the radio-frequency power amplifier of FIG. 1, hereinafter referred to as the RFPA of FIG. 1.

FIG. 1 is a schematic electrical diagram of an RF power amplifier capable of utilizing the series hard tube modulator involved in this invention; and FIG. 2a is a schematic diagram showing a preferred embodiment of the response of modulator system of this invention for controlling 3 megawatts of 200 megacycle power from this RF power amplifier.

Figure 2B:
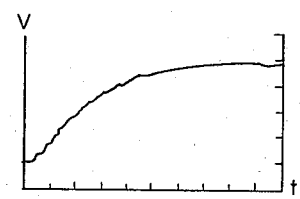
Figure 2C:
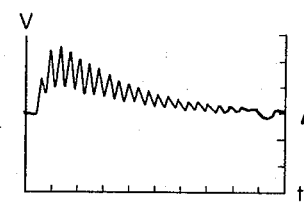
FIG. 2c is a graphic representation of the demodulated envelope of FIG. 2b differentiated to emphasize higher order cavity mode and 10 ma. beam loading for 8 μsec.–20 μsec./cm. sweep speed.

In FIG. 1 there is shown an RF power amplifier 29 consisting of an oscillator 33, drive modulated low-level stages 35, comprising one or more like stages in cascade, and high power triodes 37, 39 and 41 in cascade with two parallel connected high power triodes 43 and 45 whose outputs are combined in a magic tee 47 having a waster load 49. In this typical cascade, the sages are grid-return coaxial cavity cascade stages with coaxial gridded power tubes having thoriated tungsten-filament cathodes for heavy duty, long, pulse service. Advantageous designs of these RF tubes for this application have been high-mu triodes with amplification factors of fifty or more that are operated essentially RF drive sautrated, changing output power by plate means 51. Heretofore, this modulator has been a triggered gap plate pulse modulators having a pulse forming network or PFN and power source S'. A typical 201.066 mc. scope trace with a 10 ma. beam loading for 8 μsec.–50 μsec./cm. sweep speed for this amplifier output is shown in FIG. 2a. FIG. 2b shows the demodulated envelope for this output and FIG. 2c shows this demodulated envelope differentiated to emphasize higher cavity mode and 10 ma. beam loading for 8 μsec.–20 sec./cm. sweep speed.

An amplifier circuit of the type just described in conection with FIG. 1 is generally understood in the art and not believed to be particularly novel. However, the particular construction and arrangement of the anode modulator 51 with the remaining elements of the circuit, accomplishes in the manner to be described below the purposes of this invention.

Figure 3:
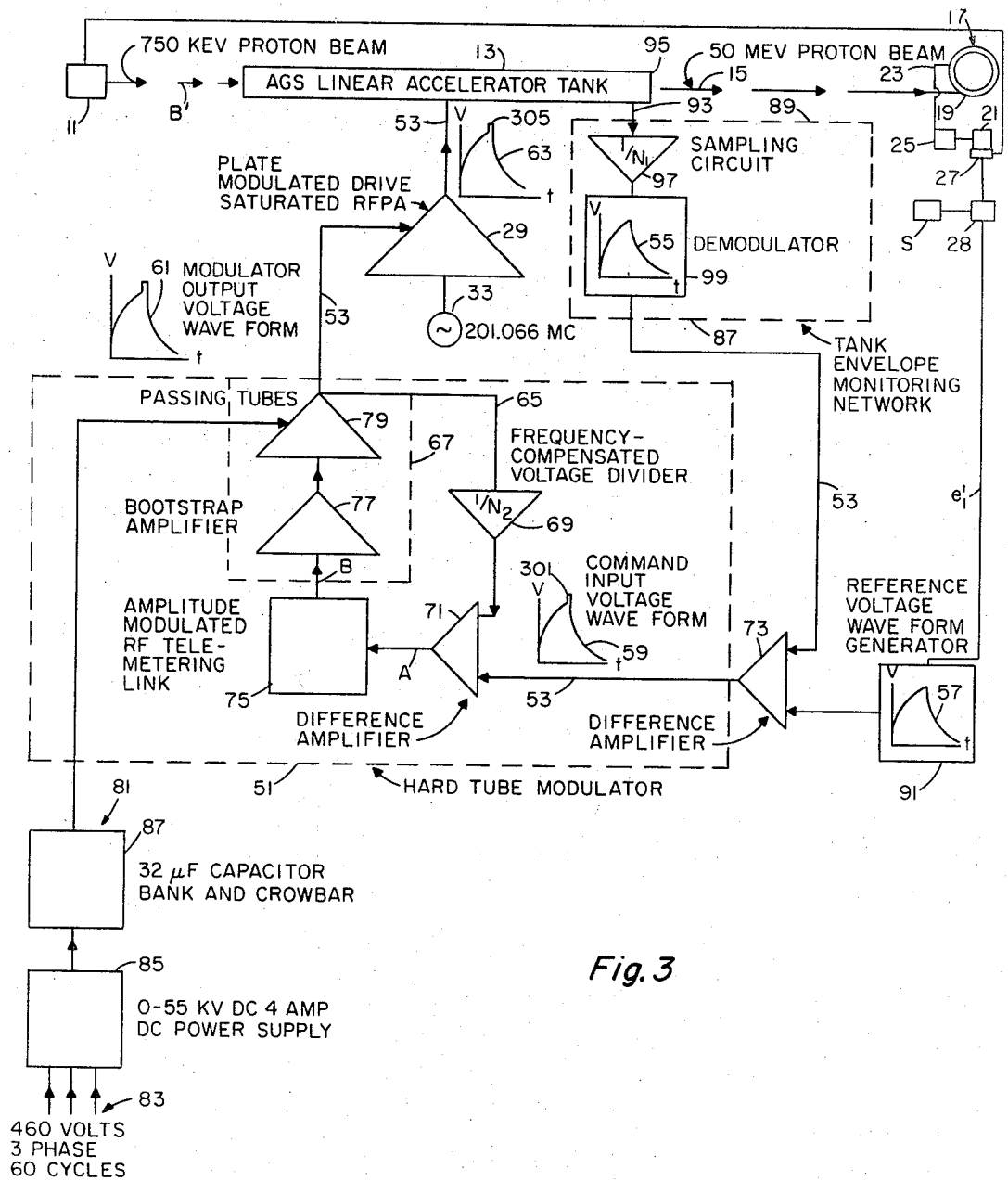
FIG. 3 is a schematic drawing of the system of this invention.

Referring to FIG. 3, in accordance with this invention, amplifier 29 is operated in a major servo-loop 53 whereby the amplifier 29 powers the linac tank 13 with an amplitude envelope and voltage gradient for accelerating the protons into beam 15 while this amplitude envelope and voltage gradient produces a corresponding signal 55 which is compared with a reference signal 57 to produce a correct command signal 59 for causing the hard tube modulator 51 to produce a control signal output 61 for producing the correct RFPA output waveform 63. Meanwhile, a minor servo loop 65 in the modulator 51 insures fast accurate response in the modulator 51 to any correction that is required in the modulator 51 by the command input signal 59 thereto, as will be understood in more detail hereinafter in connection with the major loop 53.

In the major loop 53, video amplifier 67 is connected to RFPA 29 while in the minor loop 65 the video amplifier 67 is connected through inverse feedback voltage divider 69 to difference amplifier 71. This difference amplifier 71 compares the signal from the minor loop 65 with the command signal 59 from difference amplifier 73 and feeds the resultant signal through telemetering link 75 to the video amplifier 67 for fast, accurate response in the hard tube modulator 51.

Figure 7:
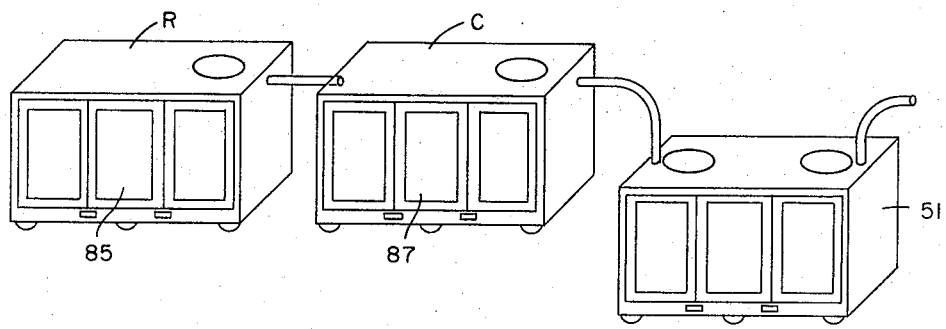
FIG. 7 is a partial three-dimensional view of the cubicle arrangement for the hard tube pulse modulator equipment of FIG. 3.

The video amplifier 67 comprises a bootstrap amplifier 77 and passing tubes 79. The passing tubes 79 have a power source 81, comprising conventional alternating source mains 83, rectifier power supply 85 and a capacitor bank 87. Advantageously, 460 volts three phase 60 cycle power from mains 83 is supplied to an 0–55 kv. DC 4 amp DC power supply 85 for supplying passing tubes 79 through a 32 μf. capacitor bank 87 and its conventional crowbar. As shown in FIG. 7, the described capacitor bank is housed in the second of three indoor cubicles, all of the same size and style mounted on casters. For ease of explanation the cubicles are designated as rectifier cubicle R and capacitor and crowbar cubicle C for the hard tube modulator cubicle 51.

The command signal 59 for modulator 51 is derived from the linac tank 13 by a monitoring circuit 89 and a reference waveform generator 91. The monitoring circuit 89 derives its input from a capacitor probe 93 adjacent the drift tubes in end 95 of the linac tank 13 wherein the amplitude envelope and voltage gradient between the drift tubes in the tank 13 actuates the probe 93 to produce the signal 55 corresponding to the amplitude envelope and voltage gradient supplied in tank 13 by amplifier 29. To this end the monitoring circuit 89 comprises a voltage divider 97 connected to the probe 93 and a demodulator 99 whereby the demodulated output 55 is produced corresponding to the amplitude envelope and voltage gradient in the tank 13.

The output from this monitor 89 is received and compared in difference amplifier 73 with the reference voltage waveform 57 from reference voltage waveform generator 91 to provide the error voltage command waveform 59 which is compared with the feedback signal from divider 69 to control the output from video amplifier 67 to provide modulated pulse DC anode power in RF power amplifier 29. This amplifier 29 in turn drives the linac tank 13 with suitable power that is continually monitored by monitor 89 and fed back through the described system to amplifier 29 for the necessary correction in the linac power input while the video amplifier 67 also functions in the minor loop 65 within the major servo loop 53 of the plate-modulated radio frequency power amplifier 29 to provide a precise rapid rise time response to any changes in the input command signal 59 from the difference amplifier 73.

By changing the reference voltage waveform 57 and repetition rate thereof in control generator 91 the waveform and repetition rate of output 61 from modulator 51 is easily adjusted for correspondingly adjusting the output 63 from the RF power amplifier 29, while the required predetermined radio frequency output from the RFPA 29 is maintained. Moreover, this system imparts an identical increased, precisely specified energy and direction to all of $10^{12}$ protons/pulse or more in the linac beam regardless of whether this happens to be a maximum possible energy, or whether only a few microamperes or as much as 100 milliamperes or more proton beam current are flowing.

A modulator circuit 51 of the type shown in FIG. 3 has been found to function successfully. For purposes of illustration, reference is made to the partial wiring diagram of FIG. 4, which shows details of this modulator 51. The command signal 59 from difference amplifier 73 enters difference amplifier 71 of the modulator 51 at ground level and enters DC wideband amplifier 101 at ground level. This amplifier 101 is connected to RF telemeter link 75 having first and second input terminals 103 and 105. Leads 107 and 109 connect this telemeter link 75 to bootstrap system 77 and passing tubes 79 at high potential. To this end lead 109 connects with the cathode of a 7698 triode 111 and lead 107 connects to the grid of triode 111. This cathode of tube 111 also connects to the negative terminal of a 100 v. source 117. The plate of triode 111 connects with junction 119 through the positive terminal of a 72 v. source 121 having a negative terminal connected through a resistor 123 to the positive terminal 100 v. source 117, the latter being connected directly to the grid of a ML6544 triode 125. The junction 119 connects with the negative terminal of a 3 kv. source 129 and the grid of a WL8461 triode 131. The positive terminal of 3 kv. source 129 connects with junction 133 through a resistor 135. This junction 133 connects with the negtiave terminal of a 3 kv. source 137 having a positive terminal connected to the plate triode 125. Junction 133 also connects with the center tap 141 of the filament of triode 131. This center tap 141 also connects with junction 151. This junction 151 connects with the grid of passing tube 79′ and through resistor 153 to the negative terminal of 3 kv. source 155. The plate of tube 79′ connects through resistor 151 to one side of 55 kv. DC power from capacitor bank 87 while the grids of passing tubes 79′ and 79″ are connected to each other, these tubes illustrated as tubes 79 in FIG. 3. The center tap 161 of the filament of tube 79′ connects with junction 163. This junction 163 connects with the positive terminal of 3 kv. source 155 and the center tap 162 of the filament of tube 79″. This center tap 167 connects with junction 171, which provides the HV pulse modulator output 61 to the RF drive modulated power amplifier 29.

This junction 171 also provides inverse feedback in modulator 51. To this end junction 171 is connected to a frequency compensated voltage divider 69 which is connected to provide an input to difference amplifier 71. This divider 69 comprises two resistors 181 and 183 and two capacitors 185 and 187.

Because of the high-gain inverse feedback circuit of the modulator 51, the output voltage waveform 61 will copy faithfully the command voltage input waveform 59 throughout a wide range of potential magnitudes and contours. Also, the waveforms of the modulator output 61 and input 59 are compared through the difference amplifier 71 at ground level. Deviations are telemetered by amplitude modulated RF link 75 to high potential floating-deck demodulator as described and bootstrap amplifier 77 driving the grids of the pair of passing tubes 79. This internal arrangement of the modulator 51 forms the pulse inverse feedback video amplifier circuit 65, functioning as the minor loop 65 within the major servo loop 53 completed by the plate-modulated linac radio frequency power amplifier 29 and tank envelope monitoring network 87 so as to form a self correcting RF power input control system to the linac, independent of beam loading or even of the presence or absence of beam.

When appreciable output currents are being drawn from the modulator 51, sudden changes due to beam loading can be compensated more rapidly than the hereinafter mentioned test specification might suggest, because of the shunt loading of the circuit capacitances by the tube dynamic resistances. Also, the voltage standing wave ratio, known as VSWR, is in the RF output circuit tank filling and emptying are reduced, since pulse plate voltage may be applied or removed, not in steps, but rather along smoothly matched curves, by contouring the leading and trailing edges of the reference voltage waveform 57.

Figure 5:
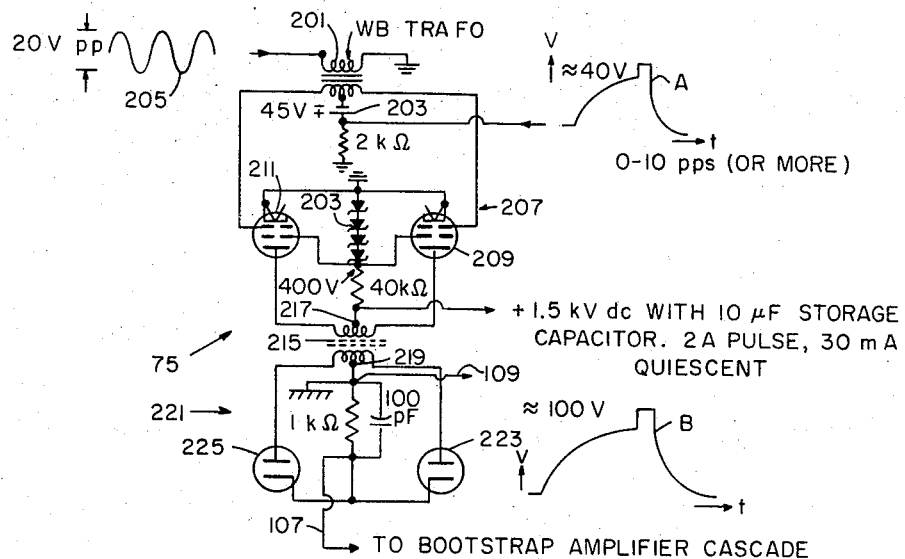
FIG. 5 is a schematic drawing of the telemetering link of FIG. 4.

A suitable telemeter link 75 is shown in FIG. 5. This link has an input transformer 201 for receiving an input wave A up to about 20 v. and 0–10 p.p.s. (or more) from difference amplifier 71 shown in FIG. 3. Advantageously, this transformer is a North Hills Electronic Co. Type 0900, 50 ohms unbalanced, 1200 ohms balanced, center-tapped .1 mc. to 30 mc. transformer. The input A is connected to a battery 203 connected to the center of one winding of transformer 201. The other winding of transformer 201 receives a 20 v. peak to peak, single ended (CW) sinusoidal carrier frequency 205 (typically 20 mc./s.±10) from a master oscillator input. The opposite ends of the winding receiving the input A are connected to a balanced amplitude modulated amplifier stage 207. The cathodes at this state are at ground, and the tubes may be grid, screen or anode modulated,. In this embodiment two grid modulated, type 4CX350A power tetrodes 209 and 211 are used. The grids of these tetrodes are biased below cut off and zener diodes 203 determine their screen potentials. During active periods they drive the primary of a rapidly rising ferrite transformer 215 having a center tapped primary 217 and a center tapped secondary 219. The secondary drives an isolated push-pull center tapped fullwave RF rectifier 221 (i.e. demodulator with RC storage network). Typically, the rectifier diodes, are television-type damper diodes 223 and 225, type 6AX4GLB but type 6BHBA or 6W4 tubes may be used. Typically the transformer comprises one or more toroids of type 4H Ferroxcube brand or Allen Bradley RO2 (or equiv.) ferrite body. The transformer windings comprise advantageously, but not exclusively, a small even number of turns (e.g. 4 or 6) of RG17AU coaxial cable for the potential differences that are contemplated in this application, in which the center coaxial cable conductor is employed as the secondary winding and the braid coaxial cable conductor is employed as the primary winding (or vice versa) at the carrier frequency of the order of 10 or higher megacycles. In this regard a 20 meg. or higher carrier is desired because the push-pull ripple is twice the carrier frequency and is purposely made high so as to be suppressed from the final output by the low pass filtering characteristic of the bootstrap amplifier cascade 77 shown in FIG. 4. It is also noted that the ferrite transformer acts to isolate the secondary from ground (i.e. the primary potential from ground) but it also has an inherent shielding quality tending to contain most of the RF magnetic field within the ferrite toroids themselves thereby minimizing leakage losses. Thus the described telemetering link 75 provides an output wave B for the bootstrap state 77 of video amplifier 67 that faithfully copies the input wave A from the difference amplifier 71 shown in FIG. 3.

The reference voltage waveform generator 91 is advantageously a sequence of Philbrick operational amplifiers but a commercial equivalent may be used having 0–40 v. capabilities. These conventional reference waveform generators are described in "A Palimpsest on the Electronic Analog Art" printed by George A. Philbrick Research, Inc. (1955), 230 Congress Street, Boston, Mass., edited by H. M. Paynter. "The Electronic Analog Computor as a Lab Tool," by George A. Philbrick and Henry M. Paynter, page 4, gives a general description thereof. One suitable basic circuit is shown on page 10 of Applications Manual for Philbrick Octal Plug-In Computing Amplifiers in FIGS. 1, 2, entitled "Adder (Inverting)." One suitable phase shifter time delay is shown in FIG. 1.15 on page 13 of that reference.

Figure 6:
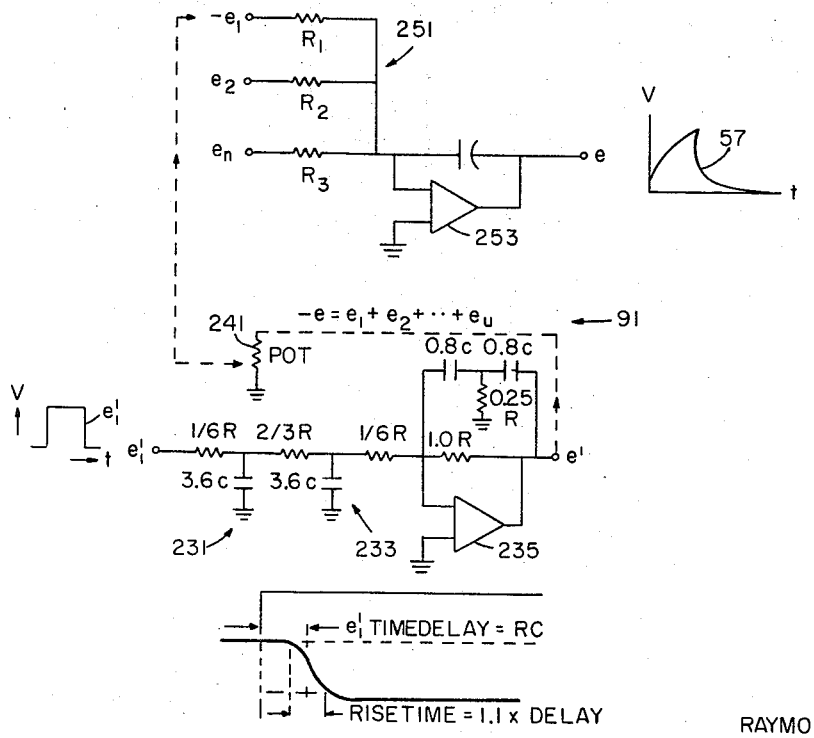
FIG. 6 is a schematic drawing of the reference wave form generator of FIG. 4.

FIG. 6 shows one embodiment of the reference waveform generator 91 of this invention. In this embodiment the rectangular signals $e'$, from monovibrators 28 are applied to $n$ conventional resistance-capacitance time delay networks illustrated with their inputs parallel and with their outputs $e'$ regulated separately with respect to time delay and rise time. To this end the time delay and rise time of the outputs $e'$ are regulated by RC networks 231 and 233 and amplifier 235, the interconnecting cascade of the time delays yielding a total delay equal to the sum of the individual delays and the rise time equalling the square root of the sum of the squares of each rise. The smaller the RC values the smaller the time delay and rise time and the larger the RC values the larger the time delay and rise time.

The amplitude of the outputs $e'$ are regulated by potentiometer 241 and the slope gradient thereof is regulated by summation operations performed by RC integrating network 251 and amplifier 253. When the input voltage signals $e_1$, $e_2$, $e_n$ are applied to the input terminals of this network 251, the voltage sum $e_1$ is delivered at the output thereof illustrated by waveform 57. The smaller the RC product the sharper is the slope of the output signal waveform 57 and the larger the RC product the slower is the slope of the output signal waveform 57. It will be understood from the above that the reference voltage waveform 57 is controlled by generator 91 and the repetition rate of this reference voltage waveform is controlled by the conventional mono-vibrators 28. The pulse length and repetition rates of the output from these monovibrators are advantageously controlled by the peaking strip 27 on control magnet 21 of the cyclic accelerator 17. This peaking strip is in turn controlled by the energization of the main cyclic accelerator magnets, which in turn is controlled from the beam therein by means of conventional magnetic pick-ups. The beam acceleration is controlled by a programmer shown in FIG. 2 of "The Radio Frequency Accelerating System of the Brookhaven Alternating Gradient Synchrotron" by M. Plotkin reprinted from the 1960 International Convention Record, Part 9, as is well understood in the art.

In operation, a 750 kev. proton beam B enters linear accelerator 13 from source 11 for acceleration to a 50 mev. proton beam having an intensity of the order of up to 100 milliamperes, i.e. up to about $4 \times 10^{12}$ protons per turn, one turn taking about 7 microseconds at 50 mev. The source 25 suitably energizes the cyclic accelerator magnets and a test magnet 21 having magnetic peaking strips 27 that respond to the magnet field to produce suitable spikes that are connected to initiate the source 11 for linac 13. These timing spikes also actuate monovibrators 28 to supply rectangular waveform outputs $e'$, to pulse generator 91 which adjusts this rectangular waveform to a predetermined envelope amplitude and voltage gradient illustrated by waveform 57. This reference waveform 57 enters difference amplifier 73 where it is compared with the monitoring signal 55 derived from the amplitude envelope and voltage gradient supplied to linac 13 by amplifier 29. The monitoring signal 55 is compared with the reference signal 57 to produce the difference output from the difference amplifier 73 in the form of waveform 59 that commands hard tube modulator 51 to make the necessary adjustment in the output from plate modulated drive saturated amplifier 29. To this end the command input voltage waveform 59 has a bump 301 corresponding to the required adjustment 305 in the waveform 63 from the RFPA 29 e.g. when the very heavy additional load of the incoming proton beam 13 is required in the first few microseconds. Also, the minor feedback loop 65 in hard tube modulator 51 provides a faithful copy and quick response so that the hard tube modulator output waveform 61 exactly corresponds to the command input voltage waveform 59. Also, to this end the telemetering link 75 provides sufficient isolation between the hard tube modulator output 61 and the output 59 from difference amplifier 73. Thus the output waveform from the RFPA 29 corresponds with the modulator input 59 and output 61 whereby the linac beam 15 has high angular and spectral purity over its high current flow range required for accelerating the linac beam to have a current flow of from a few microamperes to as much as 100 milliamperes. Also, the described control in accordance with this invention of the amplitude envelope and voltage gradient in tank 13 provides minimum breakdown therein an optimum beam output therefrom. The RFPA 29 is thus able to produce a high intensity linac beam up to the space charge repulsion limit of the cyclic accelerator 17 and/or to provide for unlimited multi-turn injection into the cyclic accelerator 17 of particles sufficient for acceleration up to the space charge repulsion limit of the cyclic accelerator 17, the adjustment of the pulse length and repetitionrate of reference signal 57 being accomplished by generator 91 and its source. In this regard the pulse length and repetition rate are adjusted by the repetition rate and pulse length of the output from the peaking strip on magnet 21, but the biasing source S for the monovibrator 28 may also be used to this end alone or in combination with this peaking strip.

In another embodiment of the reference waveform generator 91 of this invention, conventional operational integrating amplifiers are provided in an established time sequence by the connections shown in FIG. 6, the whole sequence being initiated from a conventional step function (i.e. rectangular wave) voltage generator having control means for changing the magnitude, length, and repetition rate determined as desired. To this end commercially available rectangular wave pulse generators are used. One suitable generator is the Tektronix series type 163 generator described in the 1963 Tektronix Catalogue No. 22. This generator is used to supply calibrated output pulses from zero to 25 v. in amplitude and 1 $\mu$sec. to 10 msec. in duration up to 500 kc. with generated pulses of 1 $\mu$sec. duration. The 161 generator is used to supply calibrated pulses from 0–50 v. in amplitude and 10 $\mu$sec. to 100 msec. in duration. Both generators employ external saw tooth trigger signals. One suitable trigger signal generator is the Tektronix type 162 saw tooth wave generator having a Tektronix type 160A standard power supply.

When triggered by the negative going sawtooth, the output pulse and gate are adjusted to occur at any designated point along the sawtooth. A calibrated control indicates the output delay as a fraction of the triggering sawtooth duration. Other calibrated controls indicate pulse and gate width (in milliseconds) and pulse amplitude (in volts). When triggered by a positive pulse, the same output waveforms are also available, in which case the delay control functions is a triggering level selector.

The rectangular signal is adjustable in length, amplitude and repetition rate by forming the control knob on the step wave generator whereby the envelope amplitude of the reference signal 57 shown in FIG. 3 is easily increased or decreased. The repetition or frequency of this reference signal shown in FIG. 3 is likewise easily adjustable by turning the control knob on the step wave generator. In conjunction with the integrating amplifier shown in FIG. 6 the waveform 57 shown schematically in FIG. 3 is produced and by adding or taking out one or more integrations the voltage gradient is adjusted. For example, by inserting one or more resistors $R_1$ in the integrator circuit 251 the voltage gradient or slope is decreased proportionally and by taking out one or more integrating resistors $R_1$ the voltage gradient or slope is increased proportionally. Thus the envelope amplitude and repetition rate of the reference waveform 57 are changed at will and the voltage gradient of the reference voltage waveform 57 of FIG. 3 are changed at will depending on the number of integrations their magnitudes and their magnitudes and their relative positions from the initial rectangular wave input signal.

For purpose of illustration, the following table lists the performance specification of this equipment, stipulating that the high voltage high power D.C. output pulses available from the modulator 51 of this invention for impressing upon the RF power amplifier 29 reproduce a 35 volts-into-93-ohms ideal command input waveform 63:

TABLE I

| | | |
|---|---|---|
| 1 | Pulse output voltage range | 0–35 kv. |
| 2 | Pulse output voltage ripple modulation | ≤0.2% peak. |
| 3 | Pulse output voltage amplitude jitter | ±0.2% max. for identical command voltage inputs, not synchronized with the power line frequency. |
| 4 | Pulse output current range | 0–720 amperes. |
| 5 | Pulse output width range | 30–300 microseconds. |
| 6 | Pulse output repetition rate range | 0–10 p.p.s. |
| 7 | Pulse output rise time (or fall time) | 3 microseconds 10% to 90% maximum. |
| 8 | Pulse output overshoot (or undershoot) | 5% max. with not more than 1½ cycles of ringing. |
| 9 | Pulse output sag | 0.5% maximum. |

It will be understood from the above that compact high power, high voltage, solid state rectifiers of good efficiency, typically with magnetic components and diode stacks immersed in a common oil tank may be used. Also, useful are compact, low cost, high insulation KVAR hard tube modulator capacitors; space charge emission limited power tubes with high perveances, voltage-stand off capabilities and electrode dissipation ratings; and fast crowbars for harmlessly diverting large stored energies during faults.

It is thus seen that there has been provided an economical and practical apparatus for providing a high intensity proton beam for cyclic accelerators. The invention has the advantage, for example, of providing a proton beam of $10^{12}$ protons or more with an angular beam spread of ±2 milliradians or less for injection into cyclic accelerators capable of handling beam energies of up to 33 bev. or more. Moreover, a linac amplifier is utilized employing conventional or existing components. Also, the pulse modulator of this invention operates in a practical, economical and durable manner with higher output capabilities than were possible heretofore, while providing low internal noise, favorable rise time and good transient response. Additionally, the system of this invention provides for precise control of the pulse length and repetition rates of the RF power amplifier and increased injection periods in the cyclic accelerators, comprising unlimited multi-turn injection, increased particles being provided in long injection beams in the cyclic accelerator for acceleration to the space charge repulsion limit of the cyclic accelerator.

I claim:

1. Apparatus for energizing a linear accelerator for injecting particles into a cyclic accelerator, comprising means consisting of a drive saturated radio-frequency power amplifier having a hard tube modulator and means deriving a command signal from the linear accelerator and comparing it with a reference signal for producing a modulator input signal that causes the modulator to control the amplifier for producing a signal corresponding in envelope contour, voltage gradient and repetition rate with said modulator input signal for energizing said linear accelerator to produce a high intensity beam of accelerated particles in said linear accelerator.

2. The invention of claim 1 in which said reference signal is derived from a monovibrator whose repetition rate is derived from the cyclic accelerator.

3. Particle accelerating apparatus for use with a source of highly energized charged particles, comprising a linear accelerator for receiving and accelerating said particles, and means for energizing said linear accelerator, comprising an amplitude modulated radio-frequency power amplifying means for supplying a first signal having an envelope amplitude and voltage gradient in said linear accelerator for accelerating said particles in said linear accelerator, means for sensing the envelope amplitude and voltage gradient of said first signal for developing a second signal corresponding to the envelope amplitude and voltage gradient of said first signal, means for developing a reference unidirectional voltage third signal of predetermined amplitude envelope and voltage gradient, means responsive to said second and third signals for producing a fourth signal corresponding in envelope amplitude and voltage gradient to the difference between said second and third signals, and means responsive to said fourth signal for controlling said amplifying means to produce an envelope amplitude and voltage gradient in said first signal corresponding to the envelope amplitude and voltage gradient of said third signal for accelerating said particles in said linear accelerator in a high intensity beam.

4. The invention of claim 3 having means for varying the repetition rate of said third signal for varying the repetition rate of said first signal.

5. The invention of claim 2 in which said radio-frequency power amplifying means is a drive-saturated amplitude modulated radio-frequency power amplifier having a master driving oscillator, and said means responsive to said third voltage signal is a hard tube modulator having inverse-feedback means for supplying an output voltage corresponding to said third voltage signal for controlling said amplifying means output to correspond to said reference second voltage signal whereby said output has a precisely controlled high power magnitude for producing a high intensity proton beam of high angular and spectral purity.

6. The invention of claim 2 in which said means for developing said reference second voltage signal, comprises means for adjusting the reference second voltage signal length and repetition rate for modifying the number of protons injected into said cyclic accelerator by said linear accelerator.

7. The invention of claim 2 in which said means for developing said reference second voltage signal, comprises means for adjusting the reference second voltage signal length and repetition rate for providing for multi-turn injection of said protons into said cyclic accelerator.

8. The method of producing a high intensity beam of charged particles in a cyclic accelerator having a linear accelerator injector including a source of charged particles comprising deriving a command signal from said cyclic accelerator for controlling the linear accelerator for accelerating said particles in said linear accelerator for injection and capture of said particles in said cyclic accelerator to the space charge repulsion limit of said cyclic accelerator.

9. The method of claim 8 in which the particles accelerated in said linear accelerator exceed the space charge repulsion limit of said cyclic accelerator for the injection and capture of said particles in said cyclic accelerator up to the space charge repulsion limit of said cyclic accelerator.

10. The method of claim 8 in which the instantaneous particle acceleration in said linear accelerator is below the phase space limit of said cyclic accelerator and the repetition rate of said linear particle acceleration is continued for multi-turn injection into said cyclic accelerator up to the phase space charge repulsion limit of said cyclic accelerator.

References Cited

UNITED STATES PATENTS 2,932,798   4/1960   Kerst et al. _____ 328—235

DAVID J. GALVIN, *Primary Examiner.*

JAMES W. LAWRENCE, *Examiner.*

V. LAFRANCHI, *Assistant Examiner.*